United States Patent
Prasad et al.

(10) Patent No.: US 10,360,027 B2
(45) Date of Patent: Jul. 23, 2019

(54) AUTOMATICALLY EXTRACTING A MODEL FOR THE BEHAVIOR OF A MOBILE APPLICATION

(75) Inventors: Mukul R. Prasad, San Jose, CA (US); Wei Yang, Sunnyvale, CA (US)

(73) Assignee: FUJITSU LIMITED, Kawasaki (JP)

( * ) Notice: Subject to any disclaimer, the term of this patent is extended or adjusted under 35 U.S.C. 154(b) by 614 days.

(21) Appl. No.: 13/587,920

(22) Filed: Aug. 16, 2012

(65) Prior Publication Data

US 2014/0052433 A1 Feb. 20, 2014

(51) Int. Cl.
*G06F 8/74* (2018.01)
*G06F 9/451* (2018.01)

(52) U.S. Cl.
CPC ............... *G06F 8/74* (2013.01); *G06F 9/451* (2018.02)

(58) Field of Classification Search
None
See application file for complete search history.

(56) References Cited

U.S. PATENT DOCUMENTS

| | | | |
|---|---|---|---|
| 9,152,541 B1 * | 10/2015 | Kuo ................ | G06F 11/3672 |
| 2004/0008701 A1 * | 1/2004 | Giacomini ................ | 370/401 |
| 2011/0078556 A1 * | 3/2011 | Prasad et al. ............... | 715/234 |
| 2011/0288931 A1 * | 11/2011 | Kuhn ................ | G06F 17/30864 |
| | | | 705/14.49 |

OTHER PUBLICATIONS

Andrews et al., Testing Web applications by modeling with FSMs, 2005, Springer-Veralg, pp. 326-345.*
Arlt et al., Behind the Scenes: An Approach to Incorporate Context in GUI Test Case Generation, Mar. 11, 2011, University of Freiburg, pp. 1-10.*
Li et al., A Survey on Web Application Security, Nov. 2011, Vanderbilt University, pp. 1-14.*
Tripp et al., Hybrid Analysis for JavaScript Security Assessment, 2010, ACM, pp. 1-4 (Year: 2010).*
Cho et al., Parallel Crawlers, May 2002, ACM, pp. 124-135 (Year: 2002).*
Memon et al., "GUI Ripping: Reverse Engineering of Graphical User Interfaces for Testing", WCRE 2003. In Proceedings of The 10th Working Conference on Reverse Engineering, p. 260-269.
Mesbah et al., "Crawling AJAX-Based Web Applications through Dynamic Analysis of User Interface State Changes", ACM Transactions on the Web (TWEB) TWEB Homepage archive vol. 6 Issue 1, Mar. 2012, Article No. 3.
Anand et al., "Automated Concolic Testing of Smartphone Apps," No. GIT-CERCS-12-02, Mar. 2012.

* cited by examiner

*Primary Examiner* — Aniss Chad
*Assistant Examiner* — Bernard E Cothran
(74) *Attorney, Agent, or Firm* — Maschoff Brennan

(57) ABSTRACT

A method of modeling behavior of a mobile application includes determining an action associated with the mobile application based on source code of the mobile application. The method further includes dynamically crawling through the mobile application based on the action and generating a graphical user interface (GUI) behavioral model based on dynamically crawling through the mobile application.

17 Claims, 10 Drawing Sheets

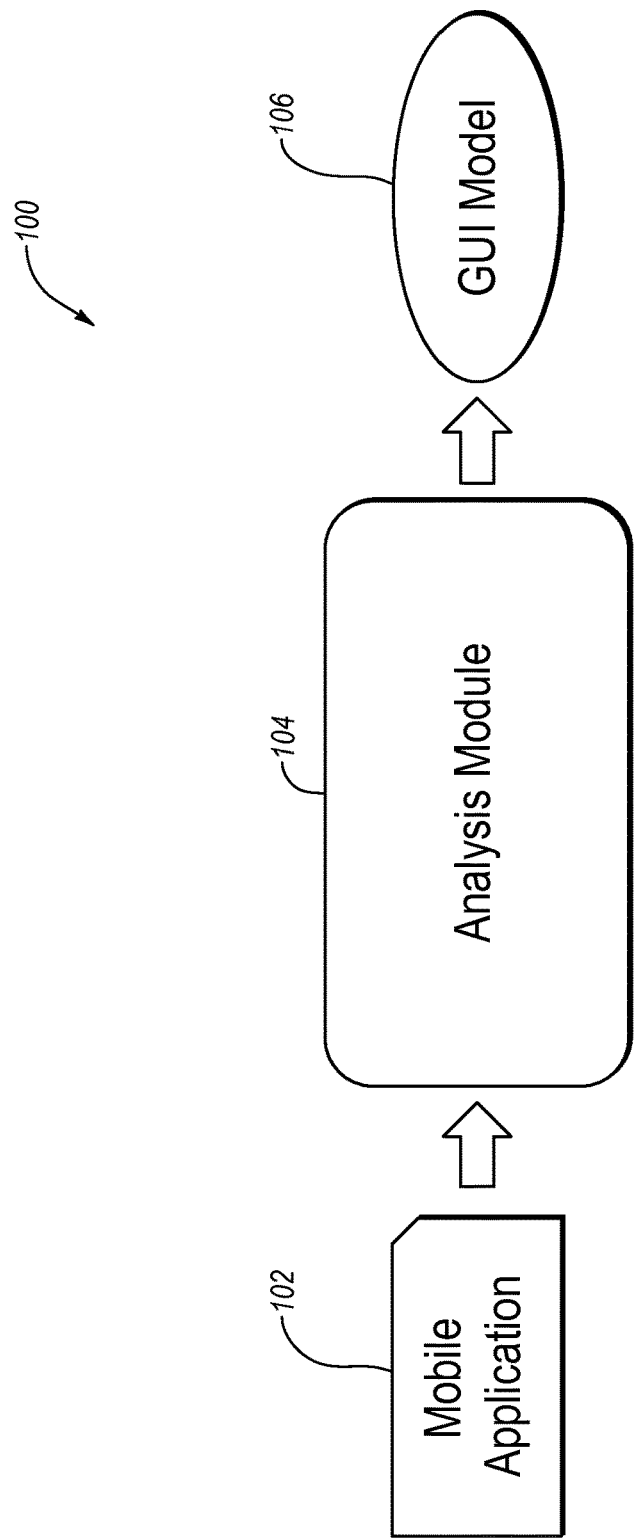

*Fig. 2A*

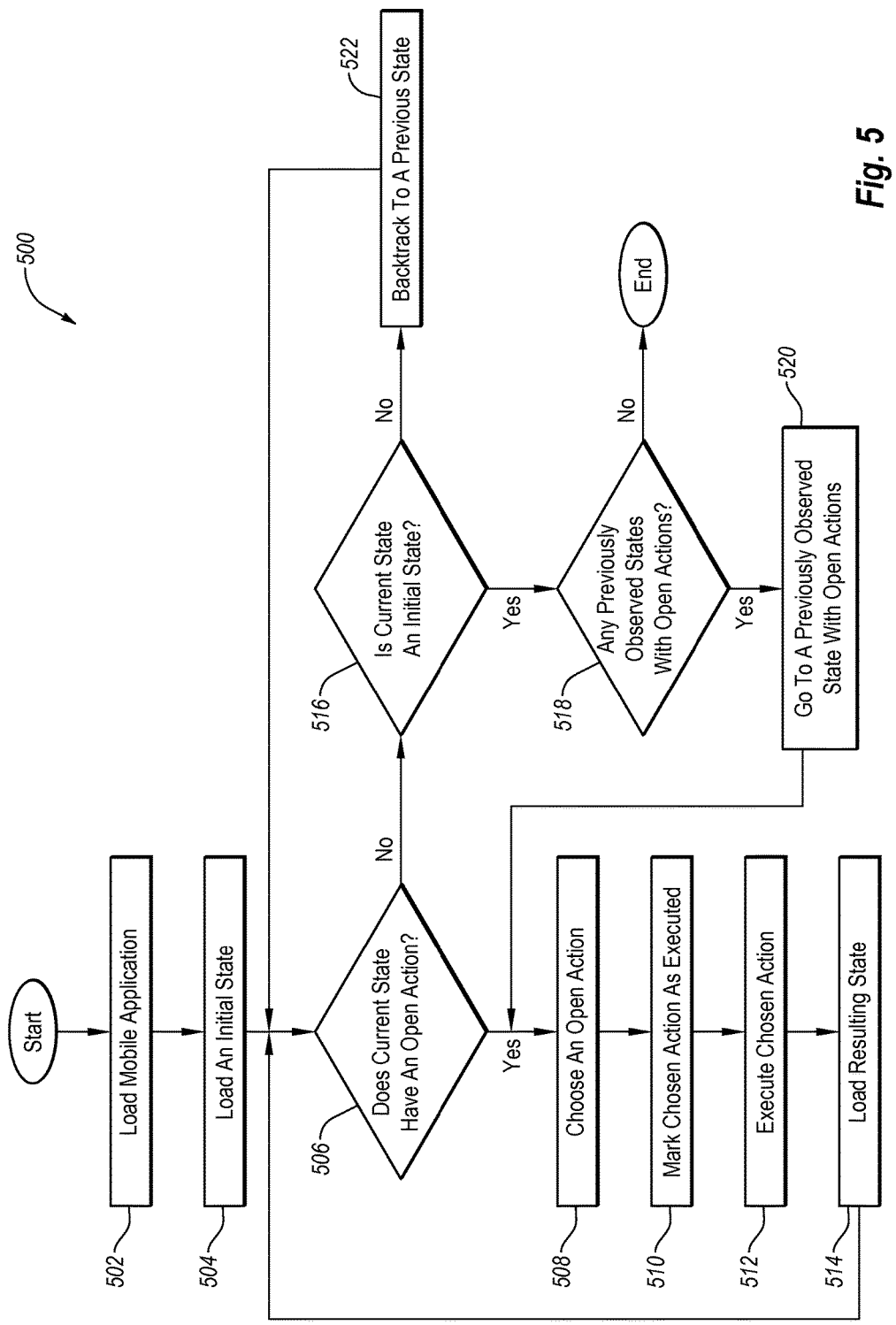

US 10,360,027 B2

AUTOMATICALLY EXTRACTING A MODEL FOR THE BEHAVIOR OF A MOBILE APPLICATION

FIELD

The embodiments discussed herein are related to automatically extracting a model of the behavior of a mobile application.

BACKGROUND

Mobile applications for mobile devices are becoming increasingly common. Many mobile applications execute operations based on actions performed on a graphical user interface (GUI) via a touchscreen, which may ease use of the mobile applications. However, the GUI and touchscreen interface of the mobile applications also provide challenges in assessing the behavior of the mobile applications.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method of modeling behavior of a mobile application includes determining an action associated with the mobile application based on source code of the mobile application. The method further includes dynamically crawling through the mobile application based on the action and generating a graphical user interface behavioral model based on dynamically crawling through the mobile application.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which:

FIG. 1 illustrates an example system of automatically extracting a model of the behavior of a mobile application;

Figure 2A:
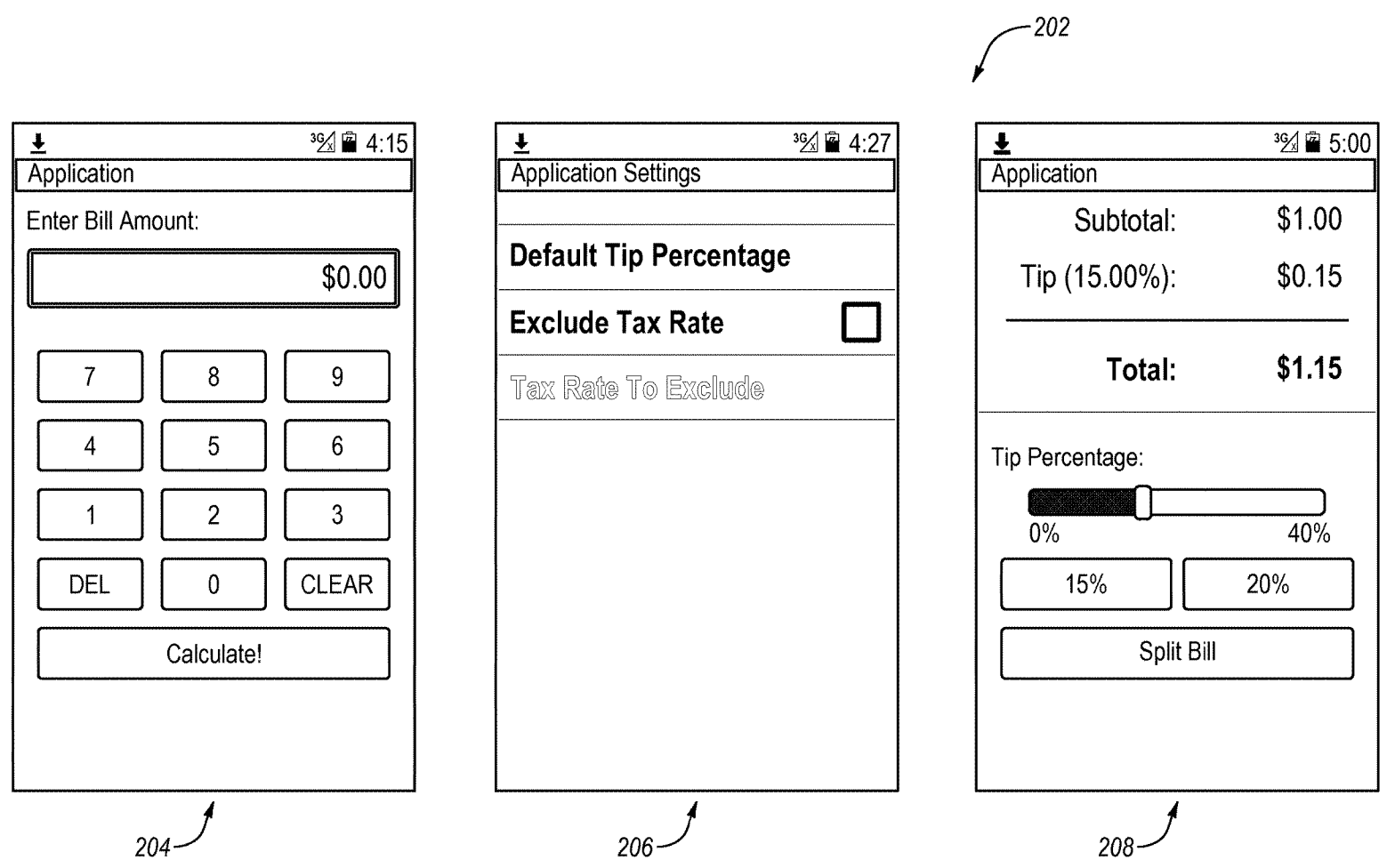

FIG. 2A illustrates example activities of a mobile application;

FIG. 5 is a flow chart of an example method of automatically extracting the behavior a mobile application.

DESCRIPTION OF EMBODIMENTS

Figure 2B:
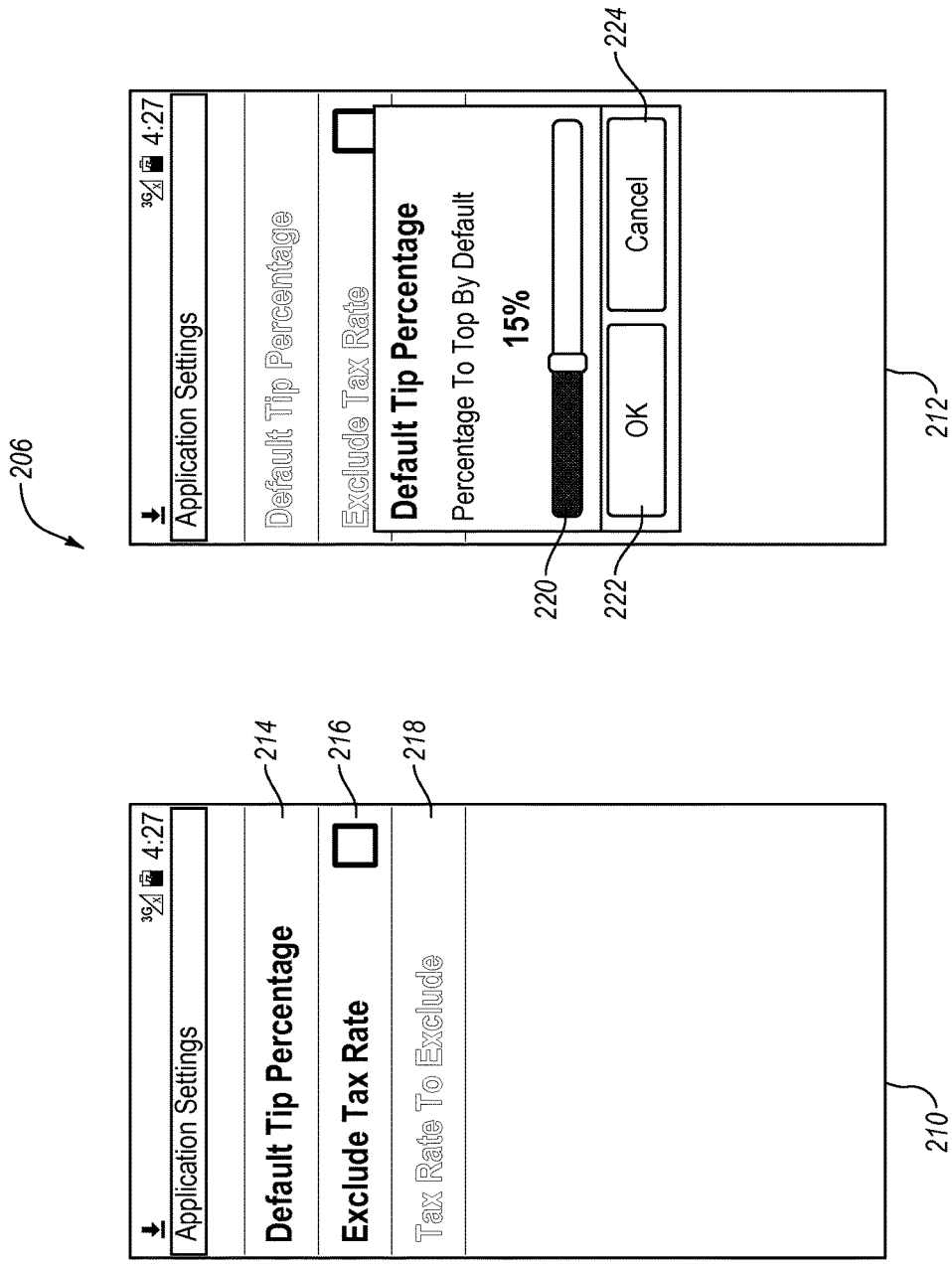
FIG. 2B illustrates example screens of an activity of FIG. 2A.

As discussed in further detail below, some embodiments of the present disclosure may include an analysis module that generates a graphical user interface (GUI) model of a GUI of a mobile application. The GUI model may include a hierarchal finite state machine (HFSM) that represents the behavior of the mobile application. In the same or alternative embodiments, based on an analysis of source code of the mobile application, the analysis module may be configured to determine which user actions may influence the behavior and cause the mobile application to perform one or more operations and transition between states of the mobile application. In some embodiments, determination of the actions may be used by a dynamic crawler of the analysis module such that the dynamic crawler may crawl through the states of the mobile application by simulating the different user actions. Accordingly, in some embodiments, the analysis module may generate the HFSM based on the determination of actions and the dynamic crawl.

Additionally, in some embodiments, the GUI model may be used during development and testing of the mobile application. In such instances, the GUI model may be used to determine whether or not the mobile application includes the functionality and features as expected or desired by the developer of the mobile application. The GUI model may thus be used to identify one or more features of the mobile application that may not function as desired and that may accordingly be modified such that the mobile application functions as desired. Therefore, a design of the mobile application may be modified based on the GUI model to aid in model-driven development (MDD) and model-based testing (MBT) of the mobile application.

Embodiments of the present disclosure are explained with reference to the accompanying drawings.

FIG. 1 illustrates an example system 100 of automatically extracting a model of the behavior of a mobile application 102, arranged in accordance with some embodiments of the present disclosure.

The mobile application 102 may be any suitable mobile application that may be included on a mobile device. The mobile device may include, but is not limited to, a tablet computer, a smart phone, a navigation system, an entertainment system, etc. In some embodiments, the mobile device may be integrated with a vehicle such as an automobile and may include a navigation and/or entertainment system of the vehicle.

The mobile application 102 may include one or more distinct GUI components (also referred to as "activities") that may be executed in a mutually exclusive fashion and that may each be associated with at least some of the operations performed by the mobile application. Examples of activities of a mobile application are illustrated below in FIG. 2A.

Each activity of the mobile application 102 may include one or more screens, where each screen may support at least a portion of the operations of the mobile application 102. To support at least a portion of the operations of the mobile application, each screen may include one or more widgets. Each widget may be configured to execute one or more of the operations of the mobile application 102 based on one or more actions performed by a user with respect to the widget.

For example, a widget may be displayed as a button on the GUI of the mobile application 102 and may be configured to execute a first operation based on a tap of the widget via a touchscreen of a mobile device. The same widget may be configured to execute a second operation based on a long tap or some other action performed on the widget via the touchscreen. Additionally, in some instances an entire screen may be configured as a widget. For example, a swipe of a screen may cause the mobile application to transition to another screen. Example screens of an activity of a mobile application are illustrated below in FIG. 2B.

Each screen may additionally include one or more states that may be based on the state of the one or more widgets associated with the screen. The state of a widget may be represented by the values of one more attributes describing the widget. For example, different states of a widget may be based on whether the widget is enabled or disabled, visible or not visible, opaque or not opaque, checked or unchecked, etc. Example states of a screen are illustrated below in FIG. 2C.

As mentioned above FIGS. 2A-2C illustrate examples of activities, screens and states of a mobile application. FIG. 2A illustrates example activities of a tipping mobile application 202 (referred to as "tipping application 202") configured to determine a tip for a bill, arranged in accordance with at least some embodiments described herein. The tipping application 202 may include a bill-input activity 204 that may be associated with entering an amount of the bill. A settings activity 206 of the tipping application 202 may be associated with changing settings of the tipping application 202. The tipping application 202 may also include a tip-total activity 208 that may be associated with displaying an amount of the tip.

In particular, FIG. 2B illustrates example screens 210 and 212 of the settings activity 206 of FIG. 2A, arranged in accordance with at least some embodiments described herein. The screen 210 may include one or more widgets associated with selecting which settings of the tipping application 202 of FIG. 2A to configure. In the illustrated embodiment, the screen 210 may include a default-tip widget 214 associated with selecting a default tip percentage, a tax-inclusion widget 216 associated with selecting to exclude or include a tax rate in the tip, and a tax-rate widget 218 associated with selecting a tax rate to exclude.

The screen 212 may include one or more widgets associated with setting the default tip percentage. As discussed in further detail below, the tipping application may transition to the screen 212 based on an action of tapping the default-tip widget 214 of the screen 210. In the illustrated embodiment, the screen 212 may include a set-default-tip widget 220 configured to set the default tip percentage, an ok widget 222 configured to "OK" the set default tip percentage, and a cancel widget 224 configured to cancel the operation of setting the default tip percentage.

Figure 2C:
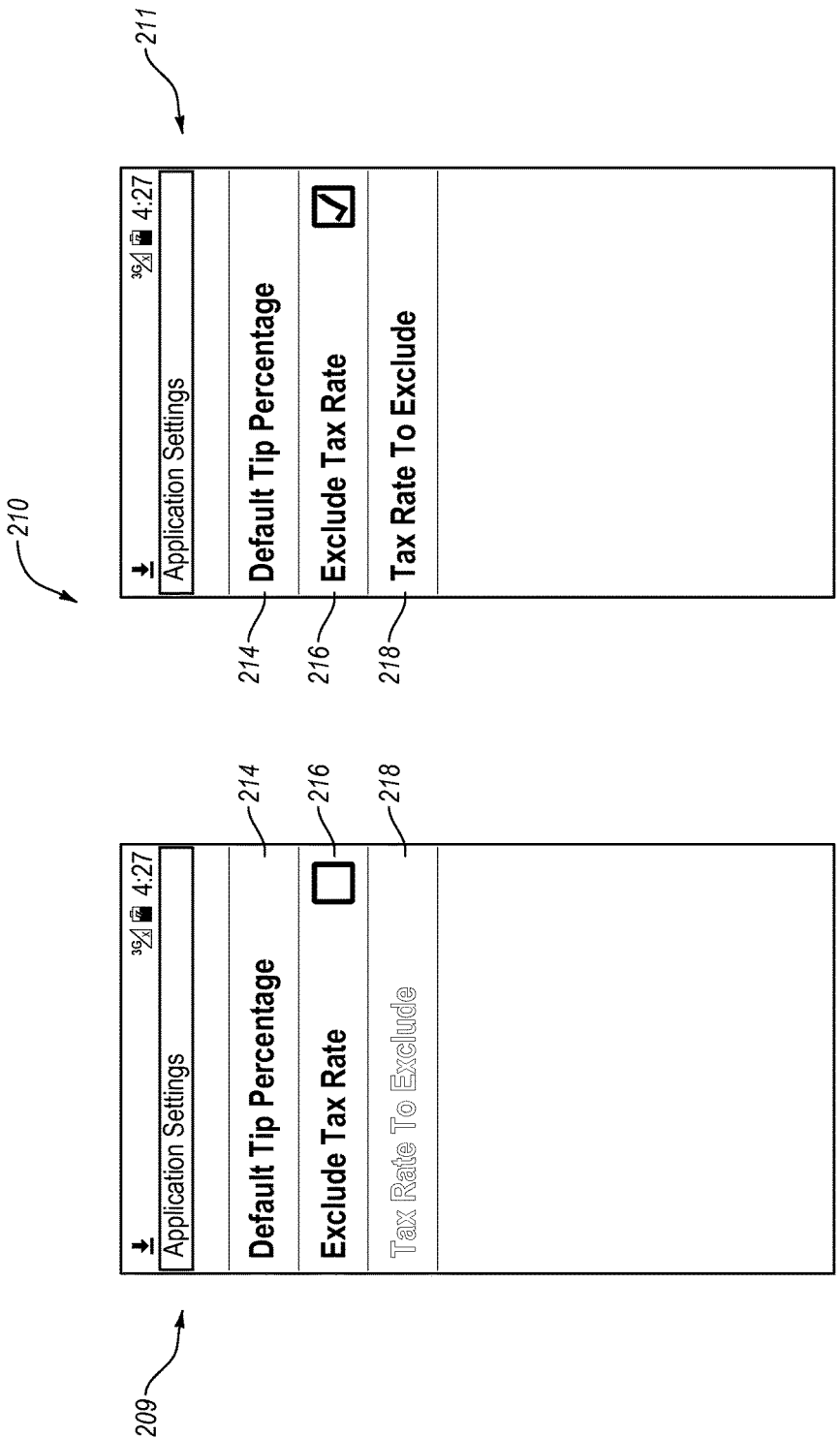
FIG. 2C illustrates example states of a screen of FIG. 2B.

FIG. 2C illustrates example states 209 and 211 of the screen 210 of FIG. 2B. In the illustrated embodiment, in the state 209 of the screen 210, the tax-inclusion widget 216 may be unchecked and the tax-rate widget 218 may be disabled. In contrast, in the state 211 of the screen 210, the tax-inclusion widget 216 may be checked and the tax-rate widget 218 may be enabled.

In some instances, an operation executed with respect to a widget may result in a transition from one state of the mobile application 102 to another state of the mobile application 102. The transition may be between states associated with the same screen and activity, states associated with different screens included with the same activity, and/or states associated with different screens that may be included in different activities.

Figure 2D:
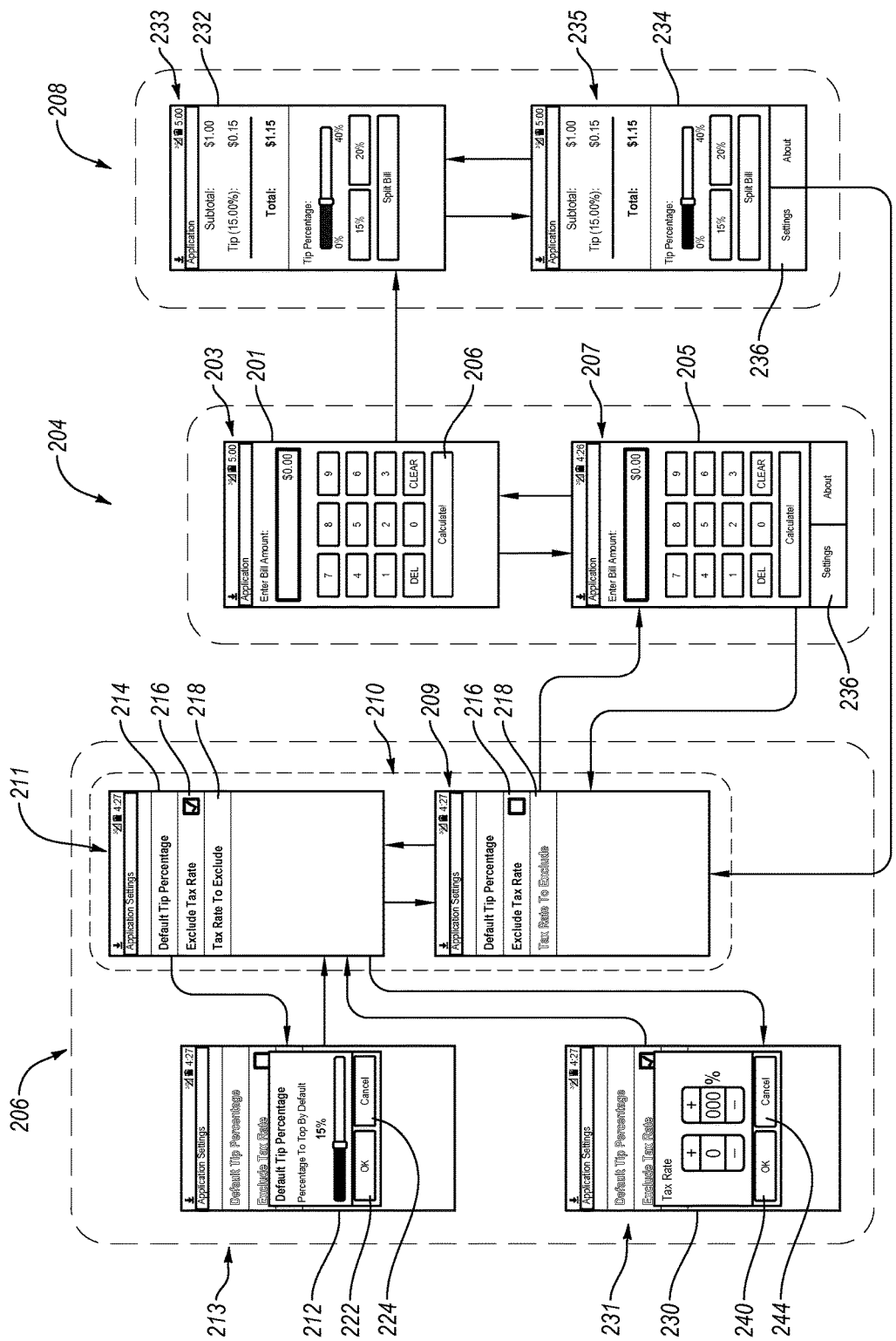
FIG. 2D illustrates example transitions between states associated with the mobile application of FIGS. 2A-2C.

FIG. 2D illustrates example transitions between states associated with the tipping application 202 of FIGS. 2A-2C. In the illustrated embodiment, the bill-input activity 204 may include a screen 201 with a state 203 and a screen 205 with a state 207. The settings activity 206 may include the screen 210 with states 211 and 209, a screen 212 with a state 213, and a screen 230 with a state 231. The tip-total activity 208 may include a screen 232 with a state 233 and a screen 234 with a state 235.

The tipping application 202 of FIG. 2A may transition from one state to another state based on operations executed by widgets of the tipping application 202 according to actions performed with respect to the widgets. Discussed below are some of transitions between states of the tipping application 202 as illustrated in FIG. 2D.

The tipping application 202 may transition from the state 203 to the state 207 of the bill-input activity 204 based on an operation associated with the action of tapping a "Menu" button (not displayed in FIG. 2D) of a mobile device that includes the tipping application 202—in the present example the "Menu" button may act as a menu widget of the tipping application 202. The tipping application 202 may transition from the state 207 back to the state 203 based on an operation executed with respect to an action of tapping a "Back" button (not displayed in FIG. 2D) of the mobile device that includes the tipping application 202—in the present example the "Back" button may act as a back widget of the tipping application 202.

The tipping application 202 may transition from the state 207 of the screen 205 to the state 209 of the screen 210 based on an operation performed with respect to an action of tapping a settings widget 236 associated with the state 207. The tipping application 202 may transition back to the state 207 from the state 209 based on an operation performed with respect to tapping the "Back" button of the mobile device.

The tipping application 202 may transition between the states 211 and 209 of the screen 210 based on an operation performed with respect to tapping on the tax-inclusion widget 216 to check or uncheck the box associated with the tax-inclusion widget 216.

The tipping application 202 may transition from the state 211 to the state 213 based on an operation performed with respect to tapping the default-tip widget 214 of the state 211. The tipping application 202 may transition back to the state 211 from the state 213 based on an operation performed with respect to tapping on the ok widget 222 or cancel widget 224.

The tipping application may transition from the state 211 to the state 231 based on an operation performed with respect to tapping the tax-rate widget 218 of the state 211. The tipping application 202 may transition back to the state 211 from the state 231 based on an operation performed with respect to tapping on an ok widget 240 or cancel widget 244.

Returning to the state 203, the tipping application 202 may also transition from the state 203 to the state 233 based on an operation performed by the tipping application 202 with respect to tapping a calculate widget 246 of the state 203. Additionally, the tipping application 202 may transition from the state 233 to the state 235 based on an operation performed with respect to tapping the "Menu" button of the mobile device. The tipping application 202 may transition back to the state 233 from the state 235 based on an operation performed with respect to tapping the "Back" button of the mobile device. Additionally, the tipping application 202 may transition from the state 235 to the state 209 based on an operation performed with respect to a tap of the settings widget 236 included and enabled in the state 235.

Accordingly, FIG. 2D illustrates some of the transitions that may be made between states of the tipping application 202. It is understood that FIGS. 2A-2D merely illustrate example activities, screens, states and transitions associated with the tipping application 202 and that the tipping application 202 may include more or fewer of any one of the activities, screens, states and transitions. Additionally, the tipping application 202 is used merely to illustrate the different activities, screens, states and transitions of a mobile application and the present disclosure is not limited to mobile applications that only relate to calculating tips.

Returning to FIG. 1, the mobile application 102 may be configured to be received by an analysis module 104 that may be configured to generate a GUI model 106 of the mobile application 102. In some embodiments, the analysis module 104 may be configured to generate the GUI model 106 such that the GUI model 106 includes an HFSM that represents the behavior of the mobile application 102.

The HFSM may include one or more first-level nodes that may each correspond to an activity of the mobile application. Each first-level node may be at a same hierarchal level in a hierarchy of the HFSM.

The HFSM may also include one or more second-level nodes. Each second-level node may correspond to a screen that may be associated with one of the activities. Each second-level node may be at a same hierarchal level and may also be lower in the hierarchy of the HFSM than the one or more first-level nodes. Additionally each second-level node may be included in one of the first-level nodes.

The HFSM may also include one or more third-level nodes. Each third-level node may correspond to a state that may be associated with one of the screens. Each third-level node may be at a same hierarchal level of the HFSM and may also be lower in the hierarchy of the HFSM than the one or more second-level nodes. Further, each third-level node may be included in one of the second-level nodes.

Additionally, the HFSM may include one or more transition edges that may each be between two third-level nodes. Each transition edge may correspond to a transition from one state of the mobile application 102 to another state of the mobile application 102. Accordingly, the analysis module 104 may be configured to receive the mobile application 102 and generate the GUI model 106 such that the GUI model 106 may represent the behavior of the mobile application 102.

Figure 3:
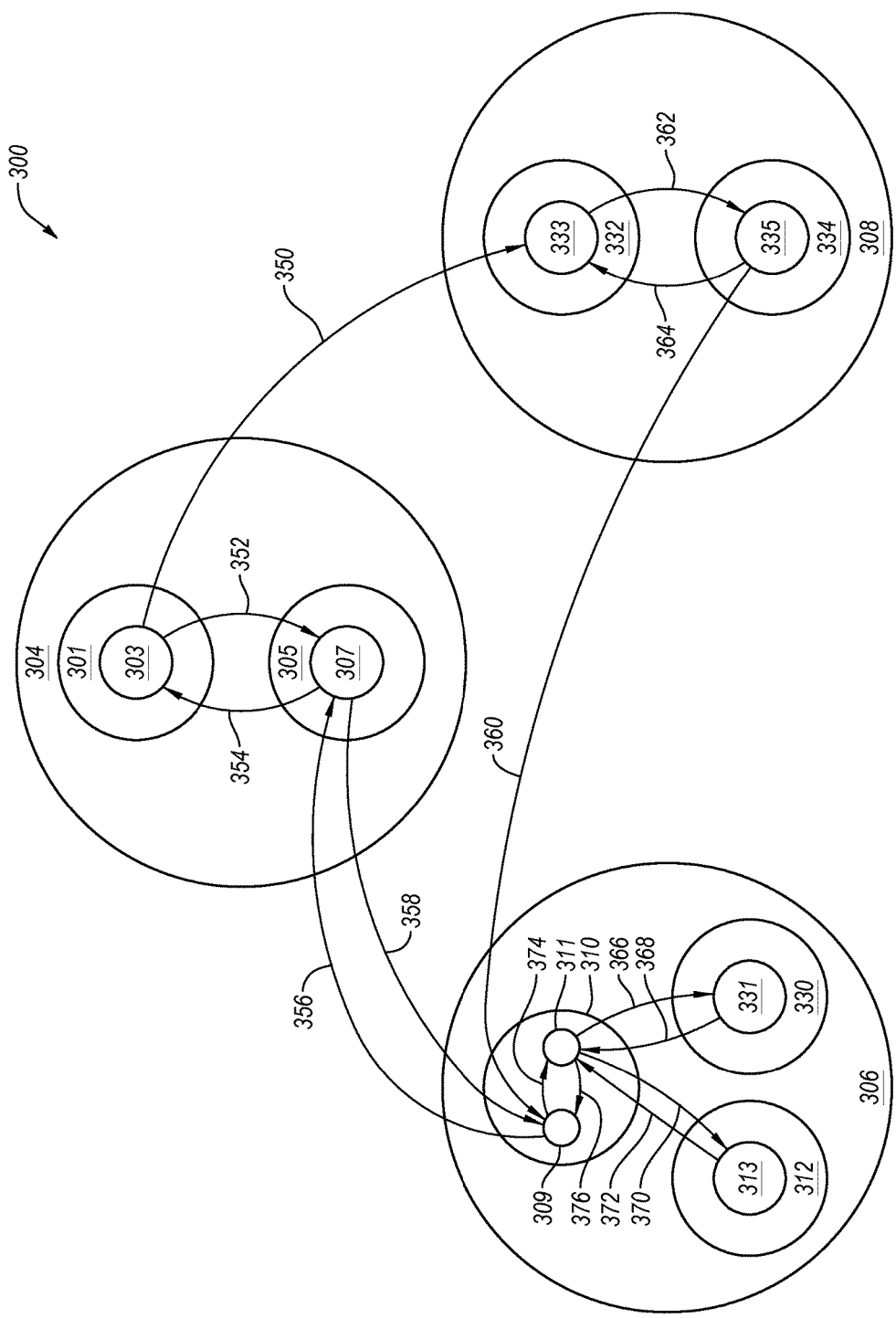
FIG. 3 illustrates a hierarchal finite state machine (HFSM) that that may represent the behavior of the mobile application of FIGS. 2A-2D.

As way of example, and not limitation, FIG. 3 illustrates an HFSM 300 that may be included in a GUI model such as the GUI model 106 and that may represent the behavior of the tipping application 202 of FIGS. 2A-2D, in accordance with some embodiments of the present disclosure.

In the illustrated embodiment, the HFSM 300 may include first-level nodes 304, 306 and 308. The first-level node 304 may correspond to the bill input activity 204 of the tipping application 202, the first-level node 306 may correspond to the settings activity 206 of the tipping application 202 and the first-level node 308 may correspond to the tip-total activity 208 of the tipping application 202. As illustrated in FIG. 3, the first-level nodes 304, 306, and 308 may be at the same hierarchal level in a hierarchy of the HFSM 300.

The first-level node 304 may include second-level nodes 301 and 305. The second-level node 301 may correspond to the screen 201 of the tipping application 202 and the second-level node 305 may correspond to the screen 205 of the tipping application 202. The second-level node 301 may include a third-level node 303 that may correspond to the state 203 of the screen 201 and the second-level node 305 may include a third-level node 307 that may correspond to the state 207 of the screen 205.

The first-level node 306 may include second-level nodes 310, 312, and 330 that may correspond to the screens 210, 212, and 230, respectively, of the settings activity 206 of the mobile application 202. The second-level node 310 may include third-level nodes 309 and 311 that may correspond to the states 209 and 211, respectively, of the screen 210. The second-level node 312 may include a third-level node 313 that may correspond to the state 213 of the screen 212 and the second-level node 330 may include a third-level node 331 that may correspond to the state 231 of the screen 230.

The first-level node 308 may include second-level nodes 332 and 334. The second-level node 332 may correspond to the screen 232 of the tip-total activity 208 of the tipping application 202 and the second-level node 334 may correspond to the screen 234 of the tip-total activity 208. The second-level node 332 may include a third-level node 333 that may correspond to the state 233 of the screen 232 and the second-level node 334 may include a third-level node 335 that may correspond to the state 235 of the screen 234.

As illustrated in FIG. 3, each of the second-level nodes of the HFSM 300 may be at the same hierarchal level and may be lower in hierarchy than the first-level nodes of the HFSM 300. Similarly, each of the third-level nodes of the HFSM 300 may be at the same hierarchal level and may be lower in hierarchy than the second-level nodes and the first-level nodes.

The HFSM 300 may also include transition edges 350, 352, 354, 356, 358, 360, 362, 364, 366, 368, 370, 372, 374 and 376. Each of the transition edges 350, 352, 354, 356, 358, 360, 362, 364, 366, 368, 370, 372, 374 and 376 may correspond to a transition from one state to another state that may be based on an action performed with respect to a widget associated with the state from which the transition occurs.

In the illustrated embodiment, the transition edge 352 between the third-level nodes 303 and 307 may correspond to the transition from the state 203 to the state 207 based on the operation associated with the action of tapping the "Menu" button of the mobile device. The transition edge 354 between the third-level nodes 303 and 307 may correspond to the transition from the state 207 to the state 203 based on the operation executed with respect to the action of tapping the "Back" button of the mobile device.

The transition edge 358 between the third-level nodes 307 and 309 may correspond to the transition from the state 207 of the screen 205 to the state 209 of the screen 210 based on the operation performed with respect to the action of tapping the settings widget 236 associated with the state 207. The transition edge 356 between the third-level nodes 307 and 309 may correspond to the transition back to the state 207 from the state 209 based on an operation performed with respect to tapping the "Back" button of the mobile device.

The transition edge 374 between the third-level nodes 309 and 311 may correspond to the transition from the state 209 to the state 211 based on the operation performed with respect to an action of tapping the tax-inclusion widget 216 to check the box associated with the tax-inclusion widget 216. The transition edge 376 between the third-level nodes 309 and 311 may correspond to the transition from the state 211 to the state 209 based on the operation performed with respect to an action of tapping the tax-inclusion widget 216 to uncheck the box associated with the tax-inclusion widget 216.

The transition edge 370 between the third-level node 311 and the third-level node 313 may correspond to the transition from the state 211 to the state 213 based on the operation performed with respect to the action of tapping the default-tip widget 214 of the state 211. The transition edge 372 between the third-level node 311 and the third-level node 313 may correspond to the transition back to the state 211 from the state 213 based on the operation performed with respect to the action of tapping the ok widget 222 or cancel widget 224.

The transition edge 366 between the third-level node 311 and the third-level node 331 may correspond to the transition from the state 211 to the state 231 based on the operation performed with respect to the action of tapping the tax-rate widget 218 of the state 211. The transition edge 368 between the third-level node 311 and the third-level node 331 may correspond to the transition back to the state 211 from the state 231 based on the operation performed with respect to the action of tapping the ok widget 240 or cancel widget 244.

Returning to the third-level node 303 included in the second-level node 301 of the first-level node 304, the transition edge 350 between the third-level node 303 and the third-level node 333 may correspond to the transition from the state 203 to the state 233 based on the operation performed by the tipping application 202 with respect to the action of tapping the calculate widget 246 of the state 203. The transition edge 362 between the third-level node 333 and the third-level node 335 may correspond to the transition from the state 233 to the state 235 based on the operation performed with respect to the action of tapping the "Menu" button of the mobile device. The transition edge 364 between the third-level node 333 and the third-level node 335 may correspond to the transition back to the state 233 from the state 235 based on the operation performed with respect to the action of tapping the "Back" button of the mobile device. Further, the transition edge 360 between the third-level node 335 and the third-level node 309 may correspond to the transition from the state 235 to the state 209 based on the operation performed with respect to an action of tapping the settings widget 236 included and enabled in the state 235.

Accordingly, the HFSM 300 of FIG. 3 may include first-level nodes that may correspond to the activities of the tipping application 202, second-level nodes that may correspond to the screens of the tipping application 202 and third-level nodes that may correspond to the states of the tipping application 202. Additionally, the HFSM 300 may include transition edges that may correspond to transitions between states based on actions performed with respect to one or more widgets. Therefore, the HFSM 300 may model and represent the behavior of the tipping application 202.

Modifications, additions, or omissions may be made to the HFSM 300 of FIG. 3 without departing from the scope of the present disclosure. For example, the HFSM 300 may include more or fewer nodes associated with activities, screens, and/or states of the tipping application 202. Additionally, the nodes may be associated with different activities, screens, and/or states than those described.

Also, in some embodiments the HFSM 300 may include different numbers of levels. For example, in some embodiments, the HFSM 300 may include a level associated with the screens and states but not the activities. In other embodiments, the HFSM 300 may include a level associated with the states but not the screens or activities.

Further, the HFSM 300 may be configured to represent the behavior of any suitable mobile application. The description of the HFSM 300 with respect to the tipping application 202 is for illustrative purposes only.

Returning to FIG. 1, as mentioned above, in some embodiments, the analysis module 104 may be configured to generate the GUI model 106 based on a dynamic crawl of the mobile application 102. The analysis module 104 may crawl through the states of the mobile application by simulating different user actions that may be performed on the widgets of the mobile application 102. In some embodiments, the analysis module 104 may also be configured to determine the user actions that may be associated with the widgets of the mobile application 102. Accordingly, in some embodiments, the analysis module 104 may crawl through the states of the mobile application 102 by simulating the different user actions determined by the analysis module 104.

Figure 4A:
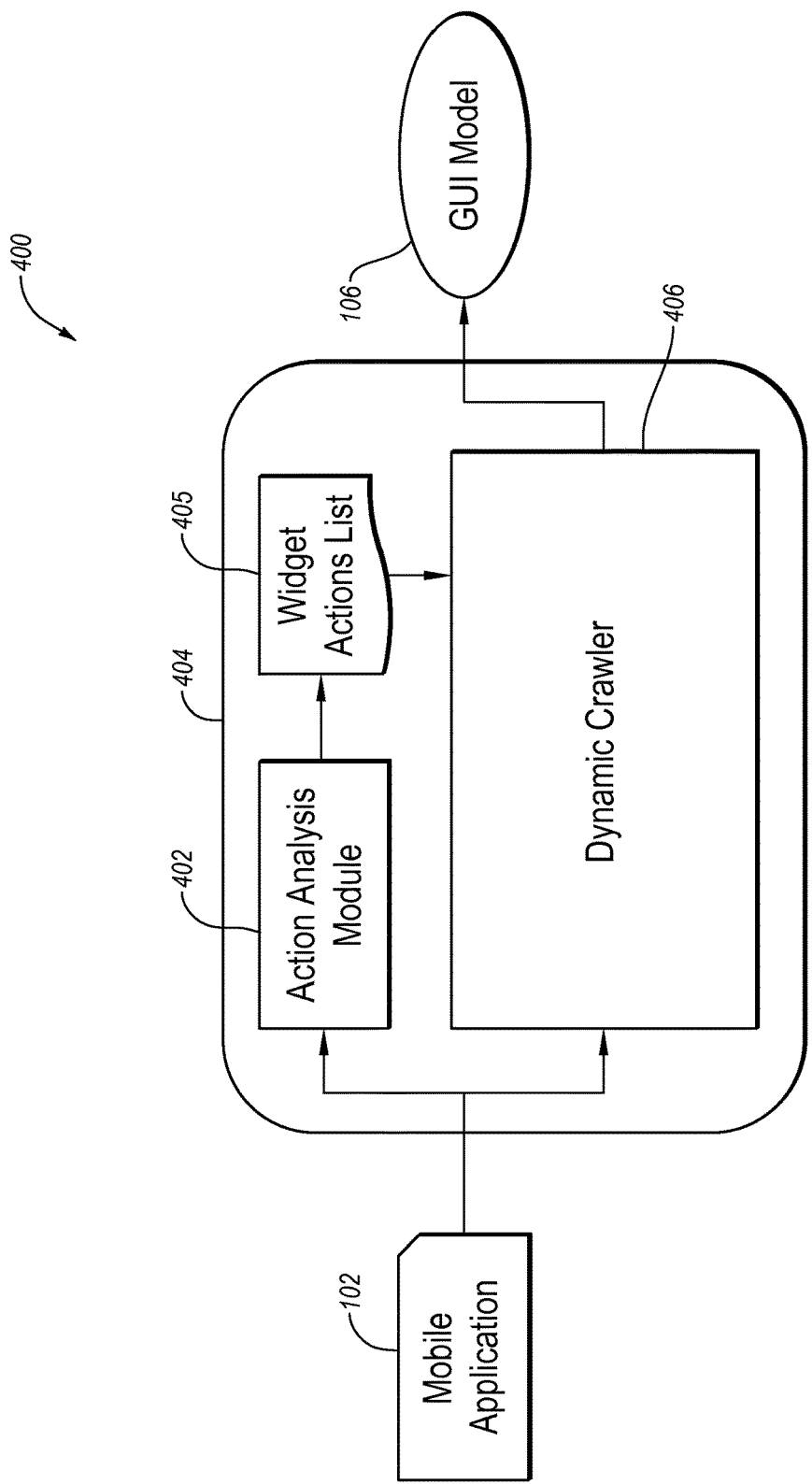
FIG. 4A illustrates another example system of automatically extracting a model of the behavior of a mobile application.

FIG. 4A illustrates another example system 400 of automatically extracting a model of the behavior of a mobile application. The system 400 may include a mobile application 102, an analysis module 404 and a GUI model 106. The mobile application 102 may correspond to the mobile application 102 of FIG. 1 and the GUI model 106 may correspond to the GUI model 106 of FIG. 1. The analysis module 404 may be configured to determine one or more actions associated with widgets of the mobile application 102 and to crawl through the mobile application 102 based on the determined actions. In the illustrated embodiment, the analysis module 404 may include an action analysis module 402, a widget action list 405, and a dynamic crawler 406.

The action analysis module 402 may be configured to determine one or more actions associated with widgets of the mobile application 102 and may output the determined actions as the widget actions list 405. In some embodiments, the action analysis module may determine the widget actions list 405 based on the source code of the mobile application 102.

Figure 4B:
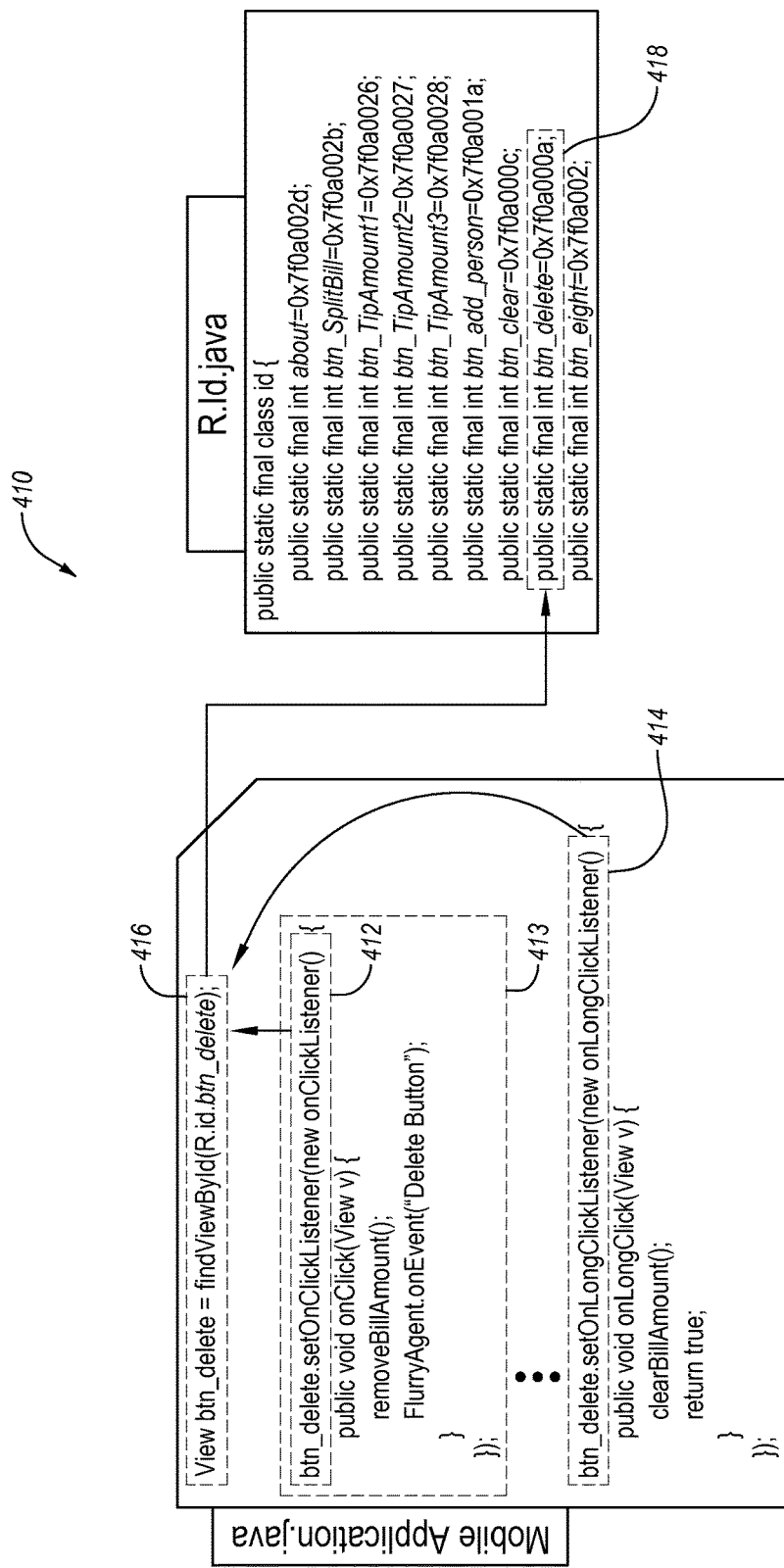
FIG. 4B illustrates example source code of a mobile application that may be analyzed to generate a widget actions list.

FIG. 4B illustrates example source code 410 of the mobile application 102 that may be analyzed by the action analysis module 402 to generate the widget actions list 405, in accordance with some embodiments of the present disclosure. In some embodiments, the action analysis module 402 may search through the source code 410 of the mobile application 102 to find a statement that associates an event-handler of the mobile application 102 (e.g., a listener, a gesture handler, etc.) with a widget of the mobile application 102. Accordingly, the action analysis module 402 may identify the widget that is associated with the event-handler by the statement based on the statement. For example, in the illustrated embodiment, the action analysis module 402 may find a statement 412 of the source code 410 that associates an event-handler with a widget "btn_delete" by calling a "setOnClickListener" method on "btn_delete." In the illustrated embodiment, the event-handler associated with "btn_delete" is defined in a program segment 413 of the source code 410. Therefore, the widget "btn_delete" may be associated with the event-handler defined in the program segment 413 based on the "setOnClickListener" method being invoked in the statement 412.

The action analysis module 402 may additionally determine which action is associated with the event-handler such that the action may be associated with the widget. The action analysis module 402 may determine the action associated with the event-handler through any suitable method, and in some instances may determine the action based on the name, type, and/or defined behavior of the event-handler. For example, in the illustrated embodiment, the event-handler of type "onClickListener" may be a class used to define an event-handler for an action associated with a tap on a widget of the GUI of the mobile application 102. Therefore, the action of a "tap" may be associated with any event-handler that may be of the event-handler type "onClickListener" such that a "tap" action may be associated with the widget "btn_delete" based on the event-handler of type "onClickListener" being associated with widget "btn_delete" in statement 412.

The action analysis module 402 may then determine an identifier of the widget. In some embodiments, the identifier may be determined based on the instantiation of the widget. The identifier may be a pointer or a hexadecimal number assigned to the widget. The action analysis module 402 may then associate the identifier and its corresponding widget with the action associated with the event-handler. For example, in the illustrated embodiment of FIG. 4B, the action analysis module 402 may identify in the source code 410 an instantiation 416 of the widget "btn_delete." The instantiation 416 may indicate a location in the source code 410 of an identifier 418 for the widget "btn_delete" (depicted as "R.id.btn_delete in the instantiation 416 of FIG. 4B). The location of the identifier 418 in the instantiation 416 may then be used to determine the identifier 418 of the widget "btn_delete." Accordingly, the identifier 418 and its corresponding widget "btn_delete" may be associated with the action of a "tap" based on the statement 412 and instantiation 416.

The action analysis module 402 may repeat the process to search for another instance of an event-handler being defined for a widget object and may associate the other definition and its associated action with a widget and its corresponding identifier. In some instances, the widget associated with the other definition and action may be the same widget associated with the previous definition and action such that multiple actions may be associated with the same widget. For example, the statement 414 of the source code 410 may associate the widget "btn_delete" with an event-handler of type "onLongClickListener" that may be associated with a long tap of a widget on the GUI of the mobile application 102. Accordingly, using the same process described above with respect to the statement 412, the action analysis module 402 may also associate the widget "btn_delete" and its corresponding identifier 418 with the action of a "long tap" based on the statement 414 and the instantiation 416.

Consequently, in some embodiments, the action analysis module 402 may be configured to generate a list of actions that may be associated with the widget. In other instances, the widget associated with the other definition and action may be a different widget such that a list of actions may be generated for the other widget also.

In the same or alternative embodiments, the action analysis module 402 may be configured to repeat the process until every instance of the definition of an event-handler and its association to a widget object has been determined. Therefore, in some embodiments, the action analysis module 402 may be configured to determine every action associated with every widget of the mobile application 102. In these and other embodiments, the action analysis module 402 may include in the widget actions list 405 the list of actions for each widget. Returning to FIG. 4A, the dynamic crawler 406 may be configured to receive the widget actions list 405 that may be determined by the action analysis module 402. Based on the identifier of each widget included in the widget actions list 405, the dynamic crawler 406 may crawl through the mobile application 102 by simulating each user action for each widget included in the widget actions list 405 such that the dynamic crawler 406 may transition between states of the mobile application 102.

In some embodiments, the dynamic crawler 406 may generate the GUI model 106 based on the crawl of the mobile application 102. In embodiments where the widget actions list 405 may include each action that may be supported by each widget within the widget actions list 405, the dynamic crawler 406 may accordingly encounter each state of the mobile application 102. Therefore, in some embodiments, the dynamic crawler 406 may generate the GUI model 106 such that the GUI model 106 may represent every state of the mobile application 102. In some embodiments, the dynamic crawler 406 may crawl through the mobile application 102 and generate the GUI model 106 based on a method described below with respect to FIG. 5.

Therefore, according to some embodiments of the present disclosure, the analysis module 404 may include the action analysis module 402 that may be configured to generate the widget actions list 405. Additionally, the dynamic crawler 406 of the analysis module 404 may use the widget actions list 405 to crawl through the mobile application 102 and generate the GUI model 106.

Modifications, additions, or omissions may be made to FIG. 4 without departing from the scope of the present disclosure. For example, although the action analysis module 402, widget actions list 405 and dynamic crawler 406 are described in the context of generating the GUI model 106, any one of the action analysis module 402, widget actions list 405 and/or dynamic crawler 406 may be used for purposes other than generation of the GUI model 106.

FIG. 5 is a flow chart of an example method 500 of automatically extracting a model of the behavior of a mobile application, arranged in accordance with some embodiments of the present disclosure. The method 500 may be implemented, in some embodiments, by a dynamic crawler, such as the dynamic crawler 406 of FIG. 4A. For instance, the dynamic crawler 406 may be configured to execute computer instructions to perform operations for modeling the behavior of the mobile application as represented by one or more of blocks of the method 500. Although illustrated as discrete blocks, various blocks may be divided into additional blocks, combined into fewer blocks, or eliminated, depending on the desired implementation.

The method 500 may begin, and at block 502, a mobile application may be loaded. At block 504, an initial state of the mobile application may be loaded. At block 506, it may be determined whether the current state of the mobile application—which may be the initial state—has any actions that have not been executed or crawled. Actions that have not been executed or crawled may be referred to hereinafter as "open actions." If the current state does have an open action at block 506, the open action may be chosen at block 508. At block 510, the chosen action may be marked as executed such that the chosen action may not be considered open anymore.

At block 512, the chosen action may be executed and, at block 514, the state resulting from the execution of the action (referred to as the "resulting state") may be loaded. Following block 514, the method 500 may return to block 506 where the resulting state may be set as the current state.

At block 506, if the current state does not have any open actions, it may be determined at block 516 whether the current state is an initial state. If the current state is not an initial state at block 516, the mobile application may be backtracked to a previous state at block 522, and the method

500 may return to block 506. In contrast, if the current state is an initial state at block 516, it may be determined at block 518 whether any previously observed or crawled states have any open actions.

If it is determined at block 518 that a previously observed state has any open actions, a previously observed state with one or more open actions may be loaded at block 520, and the method 500 may return to block 506. In contrast, if it is determined at block 518 that there are no previously observed states with open actions, the method 500 may end.

Therefore, the method 500 may be used to crawl through the mobile application and the crawl may be used to extract a model of the behavior of the mobile application.

As mentioned above, the method 500 may be implemented through the execution of computer instructions to perform operations for modeling the behavior of the mobile application. Below is an example of an algorithm that may be included in computer instructions configured to model the behavior of the mobile application.

```
crawlApplication(A, E) {
  M = null;
  s_current = getOpeningScreen(A);
  while(s_current != null) {
    //forward crawling from s_next
    s_current = forwardCrawlFromState(s_current, A, M, E);
    s_current = backtrack(s_current, A);
    if (isInitialState(s_current)) {
      s_current = findNewTargetState(s_current, M, A);
    }
  }
}
State forwardCrawlFromState(s, A, M, E) {
  s_explore = s; //next state to explore further
  while(s_explore != null) {
    s_current = s_explore;
    if(isNewState(s_current)) {
      initializeActions(s_current, E, A);
      //Initializes all actions that can be fired in this state
      addToModel(s_current, M);
    }
    e = getNextOpenAction(s_current);
    if (e == null) { // All actions exhausted
      s_explore = null;
    } else {
      s_explore = execute(s_current, e, A);
      updateOpenActions(s_current, e);
      addToModel(s_current, e, s_explore, M);
    }
  }
  return s_current;
}
```

In the above algorithm, "A" corresponds to the mobile application, "E" corresponds to a widget actions list such as the widget actions list 405 of FIG. 4A, "s" corresponds to a state of the mobile application, and "M" corresponds to the GUI model being built. Additionally, the function "getOpeningScreen( )" starts the mobile application and loads the initial screen. The function "backtrack( )" uses a "Back" button of the mobile device until the algorithm reaches a state with open (uncrawled) actions or until it reaches one of a specified set of initial screens. The function "InitialState( )" checks to see if the specified state is an initial state. The function "findNewTargetState( )" searches the model "M" for a state which has open actions and re-crawls from the current state to reach this state. The function "isNewState( )" checks if the current state is being visited for the first time and the function "initializeActions( )" gathers the set of possible actions that may be performed on the current state using the widget actions list "E." The function "addToModel( )" adds the state or transition to the model "M." The function "getNextOpenActions( )" gets the next action, from the widget actions list "E," of the current state that has not yet been crawled. The function "execute( )" simulates the specified action on the specified state of the mobile application and returns the new state reached. Additionally, the function "updateOpenActions( )" marks the specified action as having been crawled on the specified state.

In some embodiments, the algorithm may continue through the process until it has reached all of the states of the mobile application. Consequently, the algorithm may also be configured to crawl through the different states of the mobile application and may generate the GUI model based on the crawl.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For example, the method 500 may include one or more steps associated with generating a node of an HFSM for each state, screen, and/or activity of the mobile application. Further, in some embodiments, the method 500 may include one or more steps associated with determining one or more actions associated with one or more widgets of the mobile application, such as those described below with respect to FIG. 6.

Figure 6:
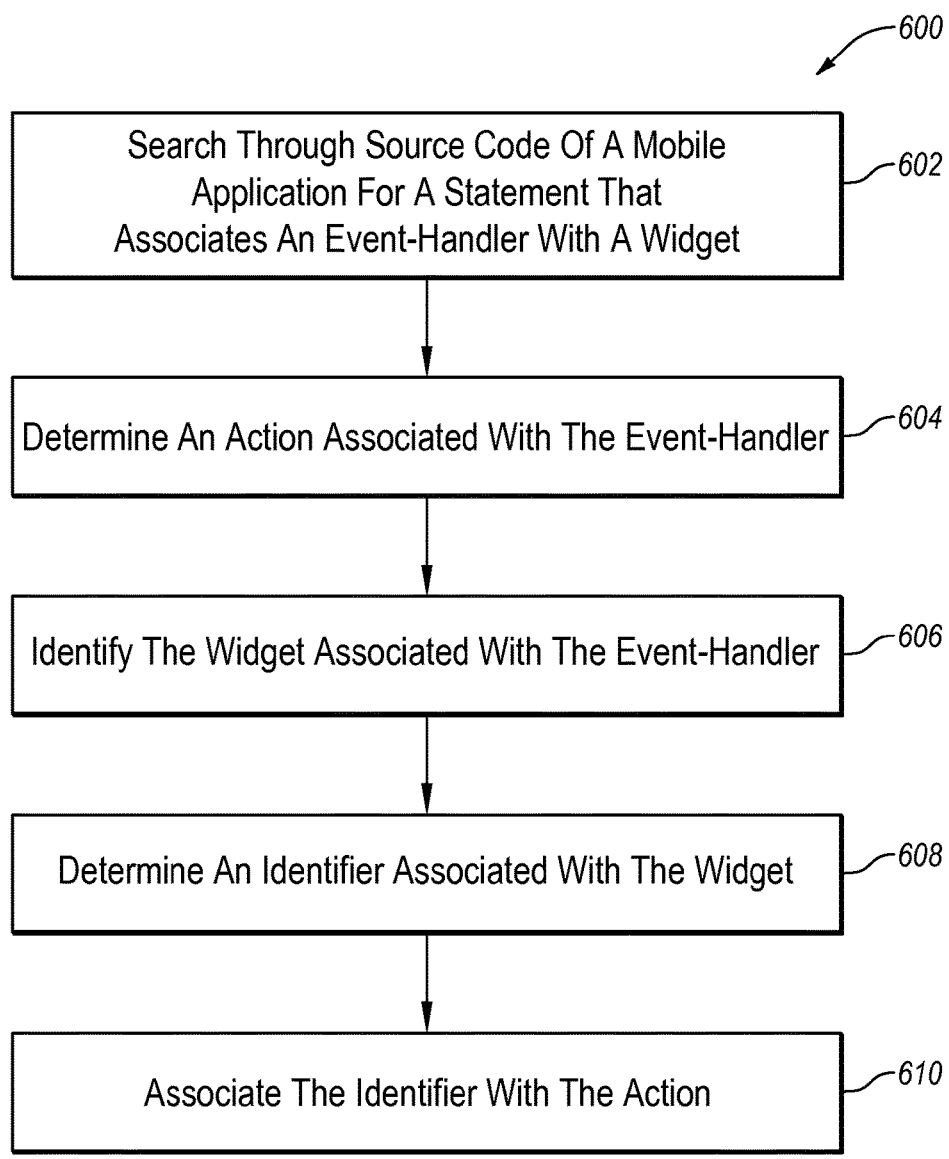
FIG. 6 is a flow chart of an example method of determining an action associated with a mobile application.

FIG. 6 is a flow chart of an example method 600 of determining an action associated with a mobile application, arranged in accordance with some embodiments of the present disclosure. The method 600 may be implemented, in some embodiments, by an action analysis module, such as the action analysis module 402 of FIG. 4A. For instance, the action analysis module 402 may be configured to execute computer instructions to perform operations for determining an action associated with a mobile application as represented by one or more of blocks 602, 604, 606, 608, and/or 610 of the method 600. Although illustrated as discrete blocks, various blocks may be divided into additional blocks, combined into fewer blocks, or eliminated, depending on the desired implementation.

The method 600 may begin at block 602 where the source code of the mobile application may be searched for a statement that associates an event-handler with a widget. At block 604, an action associated with the event-handler may be determined. At block 606, the widget that is associated with the statement may be identified. At block 608, an identifier associated with the widget may be determined and at block 610, the identifier may be associated with the action. Therefore, the method 600 may be used to determine one or more actions associated with one or more widgets of the mobile application.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For example, in some embodiments the method 600 may be repeated to determine more actions associated with the same widget or different widgets of the mobile application.

Additionally, the method 600 may be incorporated with the method 500 to generate a GUI model of the mobile application.

The embodiments described herein may include the use of a special purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may comprise tangible computer-readable storage media including RAM, ROM, EEPROM, CD-ROM or other optical disk storage, magnetic disk storage or other magnetic storage devices, or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" may refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

All examples and conditional language recited herein are intended for pedagogical objects to aid the reader in understanding the disclosure and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the disclosure.

What is claimed is:

1. A method of modeling behavior of a mobile application, the method comprising:
   determining, by a computing system, that an action is associated with a widget of a mobile application by performing a static analysis of source code of the mobile application that includes searching through text of the source code, wherein performing the static analysis of the source code includes searching through the text of the source code for a statement in the source code that associates an event-handler with a widget of the mobile application;
   determining, from the static analysis of the source code, that the action is associated with the event-handler;
   identifying, from the static analysis of the source code, the widget associated with the event-handler;
   determining, from the static analysis of the source code, an identifier associated with the widget;
   associating the identifier with the action;
   determining that the action is associated with the widget based on associating the identifier with the action and based on the identifier being associated with the widget;
   dynamically crawling through the mobile application, the dynamically crawling including:
      loading a state of the mobile application that includes the widget;
      determining, during the dynamic crawling, that the action is associated with the loaded state based on the static analysis of the source code determining that the action is associated with the widget and based on the state including the widget; and
      simulating execution of the action for the widget in the loaded state based on determining that the action is associated with the loaded state;
   generating a graphical user interface (GUI) behavioral model based on dynamically crawling through the mobile application using information derived from the static analysis;
   identifying at least one feature of the mobile application for modification based on the generated GUI behavioral model; and
   modifying a design of the mobile application based on the at least one identified feature.

2. The method of claim 1, wherein generating the GUI behavioral model comprises:
   generating a first-level node of a hierarchal finite state machine (HFSM) for each of one or more activities of the mobile application;
   generating a second-level node of the HFSM for each of one or more screens of the mobile application, each of the one or more screens associated with one of the one or more activities and each second-level node lower in a hierarchy of the HFSM than each first-level node;
   generating a third-level node of the HFSM for each of a plurality of states of the mobile application, each of the plurality of states associated with one of the one or more screens and each third-level node lower in the hierarchy of the HFSM than each second-level node; and
   generating a transition edge from a first third-level node to a second third-level node, the transition edge representing a transition from a first state of the plurality of states to a second state of the plurality of states based on the action.

3. The method of claim 1, wherein generating the GUI behavioral model comprises:
   generating a first-level node of a hierarchal finite state machine (HFSM) for each of one or more screens of the mobile application, each of the one or more screens associated with an activity of the mobile application;
   generating a second-level node of the HFSM for each of a plurality of states of the mobile application, each of the plurality of states associated with one of the one or more screens and each second-level node lower in a hierarchy of the HFSM than each second-level node; and generating a transition edge from a first second-level node to a second second-level node, the transition edge representing a transition from a first state of the plurality of states to a second state of the plurality of states based on the action.

4. The method of claim 1, wherein generating the GUI behavioral model comprises:

generating a node of a state machine for each of a plurality of states of the mobile application, each of the plurality of states associated with a screen of the mobile application; and generating a transition edge from a first node of the state machine to a second node of the state machine, the transition edge representing a transition from a first state of the plurality of states to a second state of the plurality of states based on the action.

5. The method of claim 1, further comprising determining the identifier associated with the widget based on an instantiation of the widget.

6. The method of claim 1, wherein dynamically crawling through the mobile application comprises:

crawling through a plurality of states of the mobile application until reaching an end state where all actions of the end state have been executed;

backtracking through the plurality of states until reaching a previous state of the plurality of states that includes an unexecuted action; and executing the unexecuted action associated with the previous state of the plurality of states.

7. The method of claim 1, wherein dynamically crawling through the mobile application comprises:

crawling through a plurality of states of the mobile application until reaching an end state where all actions of the end state have been executed;

backtracking through the plurality of states until reaching an initial state of the mobile application;

crawling to a previous state of the plurality of states from the initial state, the previous state including an unexecuted action; and executing the unexecuted action associated with the previous state of the plurality of states.

8. A processor configured to execute computer instructions to cause a system to perform operations for modeling behavior of a mobile application, the operations comprising:

determining, by a computing system, that an action is associated with a widget of a mobile application by performing a static analysis of source code of the mobile application that includes searching through text of the source code, wherein performing the static analysis of the source code includes searching through the text of the source code for a statement in the source code that associates an event-handler with a widget of the mobile application;

determining, from the static analysis of the source code, that the action is associated with the event-handler;

identifying, from the static analysis of the source code, the widget associated with the event-handler;

determining, from the static analysis of the source code, an identifier associated with the widget;

associating the identifier with the action;

determining that the action is associated with the widget based on associating the identifier with the action and based on the identifier being associated with the widget;

dynamically crawling through the mobile application, the dynamically crawling including:

loading a state of the mobile application that includes the widget;

determining, during the dynamic crawling, that the action is associated with the loaded state based on the static analysis of the source code determining that the action is associated with the widget and based on the state including the widget; and simulating execution of the action for the widget in the loaded state based on determining that the action is associated with the loaded state;

generating a graphical user interface (GUI) behavioral model based on dynamically crawling through the mobile application using information derived from the static analysis;

identifying at least one feature of the mobile application for modification based on the generated GUI behavioral model; and modifying a design of the mobile application based on the at least one identified feature.

9. The processor of claim 8, wherein generating the GUI behavioral model comprises:

generating a first-level node of a hierarchal finite state machine (HFSM) for each of one or more activities of the mobile application;

generating a second-level node of the HFSM for each of one or more screens of the mobile application, each of the one or more screens associated with one of the one or more activities and each second-level node lower in a hierarchy of the HFSM than each first-level node;

generating a third-level node of the HFSM for each of a plurality of states of the mobile application, each of the plurality of states associated with one of the one or more screens and each third-level node lower in the hierarchy of the HFSM than each second-level node; and generating a transition edge from a first third-level node to a second third-level node, the transition edge representing a transition from a first state of the plurality of states to a second state of the plurality of states based on the action.

10. The processor of claim 8, wherein generating the GUI behavioral model comprises:

generating a first-level node of a hierarchal finite state machine (HFSM) for each of one or more screens of the mobile application, each of the one or more screens associated with an activity of the mobile application;

generating a second-level node of the HFSM for each of a plurality of states of the mobile application, each of the plurality of states associated with one of the one or more screens and each second-level node lower in a hierarchy of the HFSM than each second-level node; and generating a transition edge from a first second-level node to a second second-level node, the transition edge representing a transition from a first state of the plurality of states to a second state of the plurality of states based on the action.

11. The processor of claim 8, wherein generating the GUI behavioral model comprises:

generating a node of a state machine for each of a plurality of states of the mobile application, each of the plurality of states associated with a screen of the mobile application; and generating a transition edge from a first node of the state machine to a second node of the state machine, the transition edge representing a transition from a first state of the plurality of states to a second state of the plurality of states based on the action.

12. The processor of claim 8, wherein determining the identifier associated with the widget is based on an instantiation of the widget.

13. The processor of claim 8, wherein dynamically crawling through the mobile application comprises:
crawling through a plurality of states of the mobile application until reaching an end state where all actions of the end state have been executed;
backtracking through the plurality of states until reaching a previous state of the plurality of states that includes an unexecuted action; and
executing the unexecuted action associated with the previous state of the plurality of states.

14. The processor of claim 8, wherein dynamically crawling through the mobile application comprises:
crawling through a plurality of states of the mobile application until reaching an end state where all actions of the end state have been executed;
backtracking through the plurality of states until reaching an initial state of the mobile application;
crawling to a previous state of the plurality of states from the initial state, the previous state including an unexecuted action; and
executing the unexecuted action associated with the previous state of the plurality of states.

15. A method comprising:
performing, by a computing system, a static analysis of source code of a mobile application that includes searching through text of the source code to find a statement in the source code that associates an event-handler with a widget of the mobile application;
determining, from the static analysis of the source code, an action associated with the event-handler based on the statement;
identifying, from the static analysis of the source code, the widget associated with the event-handler;
determining, from the static analysis of the source code, an identifier associated with the widget;
associating the identifier with the action;
determining that the action is associated with the widget based on associating the identifier with the action and based on the identifier being associated with the widget;
dynamically crawling through the mobile application by simulating execution of the action for the widget at a state of the mobile application that includes the widget based on the state including the widget and based on the action having been determined to be associated with the widget from the static analysis of the source code;
generating a graphical user interface (GUI) behavioral model based on dynamically crawling through the mobile application using information derived from the static analysis;
identifying at least one feature of the mobile application for modification based on the generated GUI behavioral model; and
modifying a design of the mobile application based on the at least one identified feature.

16. The method of claim 15, further comprising generating a list of actions associated with the widget based on associating the identifier with the action.

17. The method of claim 15, wherein generating the GUI behavioral model comprises:
generating a node of a state machine for each of a plurality of states of the mobile application, each of the plurality of states associated with a screen of the mobile application; and
generating a transition edge from a first node of the state machine to a second node of the state machine, the transition edge representing a transition from a first state of the plurality of states to a second state of the plurality of states based on the action.

\* \* \* \* \*